United States Patent [19]
Mimura

[11] Patent Number: 6,040,975
[45] Date of Patent: Mar. 21, 2000

[54] TANTALUM POWDER AND SOLID ELECTROLYTIC CAPACITOR USING THE SAME

[75] Inventor: Kazuya Mimura, Tokyo, Japan

[73] Assignee: NEC Corporation, Tokyo, Japan

[21] Appl. No.: 09/105,482

[22] Filed: Jun. 26, 1998

[30] Foreign Application Priority Data

Jun. 30, 1997 [JP] Japan ................................... 9-173660

[51] Int. Cl.⁷ .................................................. H01G 9/042
[52] U.S. Cl. ............................................ 361/523; 361/529
[58] Field of Search ................................. 361/523, 525, 361/529, 528, 509

[56] References Cited

U.S. PATENT DOCUMENTS

| | | |
|---|---|---|
| 4,041,359 | 8/1977 | Mizushima et al. ................. 361/529 |
| 4,645,533 | 2/1987 | Izumi ....................................... 420/427 |
| 4,805,074 | 2/1989 | Harakawa et al. ..................... 361/525 |

FOREIGN PATENT DOCUMENTS 8-97095  4/1996  Japan.

*Primary Examiner*—Kristine Kincaid
*Assistant Examiner*—Anthony Dinkins
*Attorney, Agent, or Firm*—Laff, Whitesel & Saret, Ltd.; J. Warren Whitesel

[57] ABSTRACT

Tantalum powder and solid electrolytic capacitor using the same are disclosed. Cohered powder or Low CV powder is added to High CV powder in order to noticeably enhance an anchor effect during molding and therefore to increase the mechanical strength of a molding. Further, the addition of powder cohered beforehand prevents a contraction ratio from increasing at the time of sintering and thereby prevents the cavity distribution of an anode body from increasing, so that the electrical characteristic is improved.

4 Claims, 3 Drawing Sheets

Fig. 3

| SAMPLE NO. | ADDITION RATIO (w%) | GRAIN SIZE OF ADDED POWDER (μm) | STRENGTH OF MOLDING (kg) | Tanδ (%) | CV (CV/g) | CONTRACTION RATIO (%) |
|---|---|---|---|---|---|---|
| ※1 1 | 0 | — | 4.98 | 187.0 | 52400 | 7.61 |
| ※1 2 | | | 6.45 | 193.8 | 52000 | 8.60 |
| ※1 3 | | | 5.46 | 190.5 | 51000 | 7.31 |
| ※2 4 | 2 | ~40μm | 7.23 | 191.3 | 51000 | 7.90 |
| ※2 5 | | | 7.35 | 190.2 | 50600 | 7.87 |
| 6 | | 40μm~200μm | 7.98 | 180.5 | 51800 | 7.36 |
| 7 | | | 7.58 | 183.0 | 51000 | 7.47 |
| 8 | | | 7.72 | 181.3 | 51300 | 7.44 |
| ※2 9 | | 200μm | 7.80 | 178.2 | 48100 | 7.40 |
| ※2 10 | | | 7.78 | 175.8 | 48500 | 7.44 |
| ※2 11 | 5 | ~40μm | 7.95 | 198.4 | 51000 | 7.47 |
| ※2 12 | | | 8.10 | 199.1 | 50000 | 7.45 |
| 13 | | 40μm~200μm | 9.02 | 181.3 | 49300 | 7.35 |
| 14 | | | 9.12 | 180.3 | 49700 | 7.35 |
| 15 | | | 8.75 | 182.0 | 49000 | 7.37 |
| ※2 16 | | 200μm | 9.32 | 178.5 | 47700 | 7.28 |
| ※2 17 | | | 9.20 | 180.0 | 48100 | 7.30 |
| ※3 18 | 6 | ~40μm | 9.85 | 200.0 | 48000 | 7.45 |
| ※3 19 | | | 9.90 | 198.7 | 47000 | 7.43 |
| ※1 20 | | 40μm~200μm | 10.20 | 178.5 | 48100 | 7.27 |
| ※1 21 | | | 10.00 | 180.0 | 47300 | 7.31 |
| ※3 22 | | 200μm | 11.00 | 180.0 | 45500 | 7.15 |
| ※3 23 | | | 10.70 | 175.0 | 46000 | 7.20 |

Fig. 4

| SAMPLE NO. | ADDITION RATIO (w%) | STRENGTH OF MOLDING (kg) | Tanδ (%) | CV (CV/g) | CONTRACTION RATIO (%) |
|---|---|---|---|---|---|
| ※1 | 0 | 4.98 | 187.0 | 52400 | 7.61 |
| ※1 | | 6.45 | 193.8 | 52000 | 8.80 |
| ※1 | | 5.46 | 190.5 | 51000 | 7.31 |
| 2 | 2 | 7.22 | 170.2 | 50000 | 7.33 |
| 2 | | 7.50 | 173.0 | 50200 | 7.42 |
| 3 | 5 | 8.68 | 170.3 | 50000 | 7.32 |
| 3 | | 9.00 | 171.5 | 49800 | 7.48 |
| ※4 | 6 | 10.00 | 165.8 | 47300 | 7.25 |
| ※4 | | 10.25 | 167.8 | 47000 | 7.33 |

…

TANTALUM POWDER AND SOLID ELECTROLYTIC CAPACITOR USING THE SAME

BACKGROUND OF THE INVENTION

The present invention relates to a tantalum powder and a solid electrolytic capacitor using the same.

Tantalum powder for a solid electrolytic capacitor has customarily been produced by reducing potassium tantalum fluoride by metal sodium. An anode body for a solid electrolytic capacitor can be produced by adding an adequate binder to the tantalum powder, molding the resulting mixture, and then sintering the resulting molding. Generally, High CV powder with a great CV value has a small grain size and has a low mechanical strength when molded. In light of this, it is a common practice to increase the density of the molding in order to increase the mechanical strength. However, an increase in the density of the molding results in a decrease in CV value (capacity) and an increase in tan δ value (electrical characteristic), adversely effecting the characteristic of the capacitor.

Japanese Patent Laid-Open Publication No. 8-97095, for example, teaches tantalum powder for the anode of an electrolytic capacitor and capable of increasing the mechanical strength of a sintered body. This tantalum powder consists of tantalum powder having a mean grain size of 1.0 μm to 5.0 μm and 10 nm to 500 nm tantalum powder having a mean particle size of 10 nm to 500 nm and added to the above tantalum powder in an amount of 1 wt % to 25 wt %. The tantalum powder whose mean grain size is 1.0 μm to 5.0 μm is selected from a group consisting of high pressure, low capacity powder whose CV value is 10,000 μF/g to 15,000 μF/g, high pressure, medium capacity powder whose CV value is 20,000 μFV/g to 30,000 μFV/g, and medium pressure, high capacity powder whose CV value is 30,000 μFV/g.

However the problem with the above Laid-Open Publication No. 8-97095 is that the tantalum powder having a mean grain size of 10 nm to 500 nm promotes sintering and thereby reduces the cavity distribution of the resulting anode body. This adversely effects the electrical characteristic (tan δ value).

SUMMARY OF THE INVENTION

It is therefore an object of the present invention to provide tantalum powder capable of enhancing the mechanical strength and electrical characteristic of a molding, and a solid electrolytic capacitor using the same.

In accordance with the present invention, in tantalum powder for an anode body included in a solid electrolytic capacitor, cohered powder having a grain size ranging from 40 μm to 200 μm is added to raw powder having a CV value greater than 40,000 μFV/g inclusive in an amount of 2 wt % to 5 wt %.

Also, in accordance with the present invention, in a solid electrolytic capacitor, an anode body is produced by sintering tantalum powder consisting of raw powder having a CV value greater than 40,000 μFV/g inclusive and cohered powder having a grain size ranging from 40 μm to 200 μm and added to the raw powder in an amount of 2 wt % to 5 wt %.

Further, in accordance with the present invention, in tantalum powder for an anode body included in a solid electrolytic capacitor, powder having a CV value ranging from 20,000 μFV/g to 30,000 μFV/g is added to raw powder having a CV value greater than 40,000 μF/g inclusive in an amount of 2 wt % to 5 wt %.

Moreover, in accordance with the present invention, in a solid electrolytic capacitor, an anode body is formed by sintering tantalum powder consisting of raw powder having a CV value greater than 40,000 μFV/g inclusive and powder having a CV value ranging from 20,000 μFV/g to 30,000 μF/g and added to the raw powder in an amount of 2 wt % to 5 wt %.

BRIEF DESCRIPTION OF THE DRAWINGS

The above and other objects, features and advantages of the present invention will become apparent from the following detailed description taken with the accompanying drawings in which:

FIG. 3 is a table listing various mixture ratios of raw powder and cohered powder and representative of a preferred embodiment of the present invention; and FIG. 4 is a table similar to FIG. 3 and representative of an alternative embodiment of the present invention.

DESCRIPTION OF THE PREFERRED EMBODIMENTS

Figure 1:
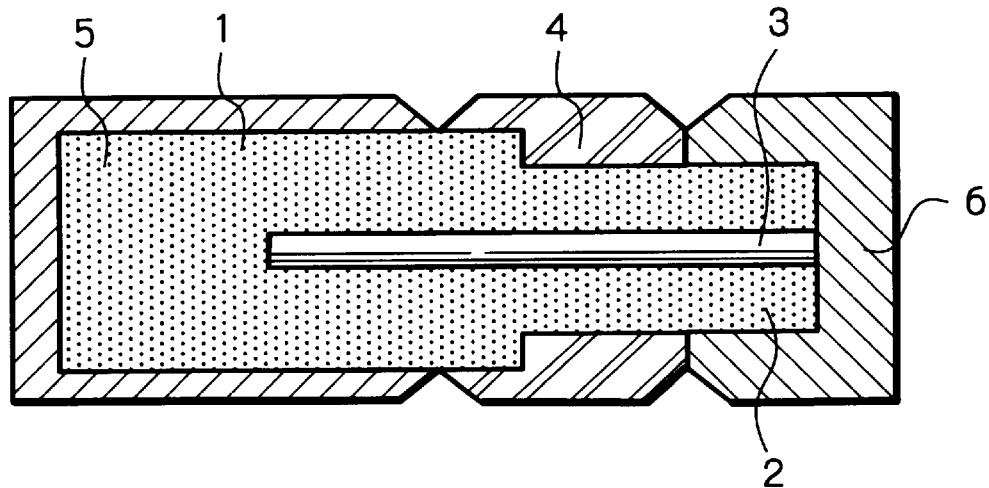
FIG. 1 is a section showing a solid electrolytic capacitor to which the present invention is applied.

Referring to FIG. 1 of the drawings, a solid electrolytic capacitor to which the present invention is applied is shown. As shown, the capacitor includes an anode body 1 formed by sintering tantalum powder and having a projection 2 at its one end. An anode wire 3 is buried in the projection 2 and formed of, e.g. tantalum. A sheath 4 formed of an insulator surrounds the intermediate portion of the anode body 1. A cathode electrode 5 and an anode electrode 6 are formed on the anode body 1 at both sides of the sheath 4. The anode electrode 6 is positioned on the projection 2.

Figure 2:
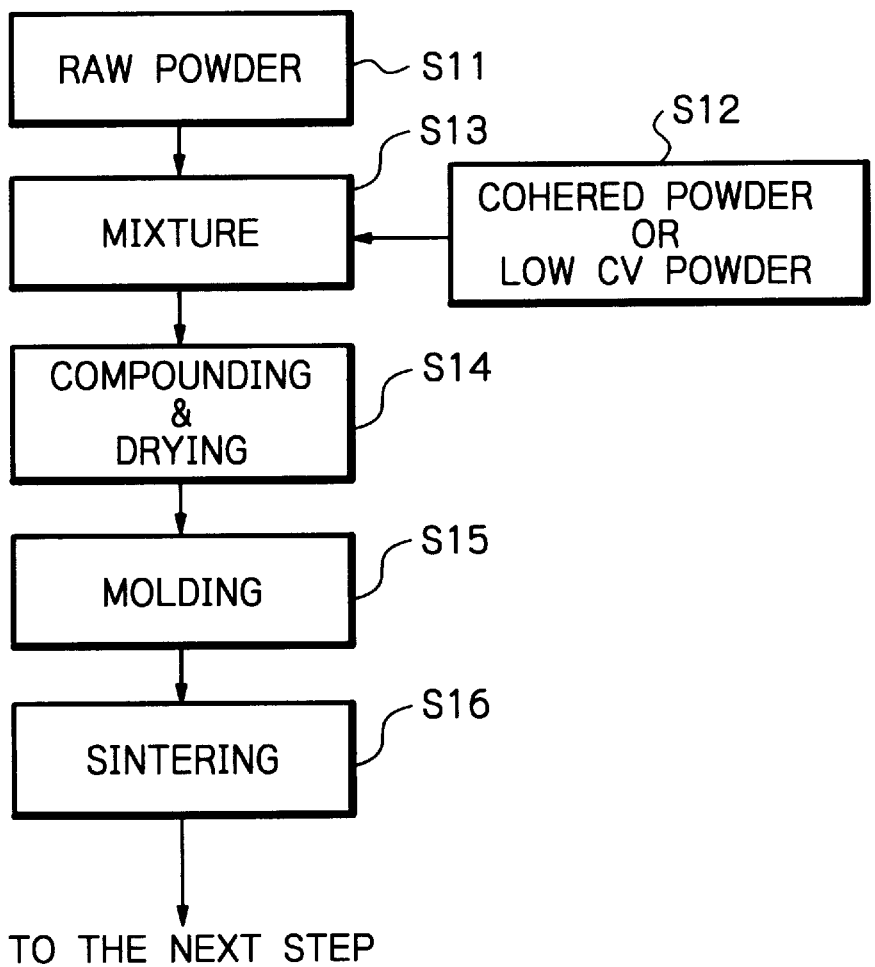
FIG. 2 is a section demonstrating a procedure for producing the capacitor of FIG. 1.

Reference will be made to FIG. 2 for describing a procedure for producing the anode body 1 of the above electrolytic capacitor by use of tantalum powder in accordance with the present invention. First, raw tantalum powder is prepared (step S11). At the same time, different kinds of cohered powder each having a particular grain size are prepared (step S12). Each cohered powder is weighted and then mixed with the raw tantalum powder (step S13). After an adequate amount of binder has been added to each of the resulting powder mixtures, the mixtures are dried (step S14). The dried power mixtures each is molded together with a tantalum wire by a molding machine (step S15). The resulting moldings were sintered in vacuum (step S16). The sintering step is followed by anodic synthesis effected in a phosphoric acid solution in order to form a synthetic film, although not shown in FIG. 2 specifically. After the anodic synthesis, the sheath 4, cathode electrode 5 and anode electrode 6, FIG. 1, are formed to complete the capacitor.

A first embodiment of the present invention will be described hereinafter. In the procedure shown in FIG. 2, the raw tantalum powder had a CV value of 50,000 μFV/g. Cohered powder having a grain size ranging from 40 μm to 200 μm cohered powder having a grain size less than 40 μm, and cohered powder having a grain size greater than 200 μm were prepared. Each cohered powder was weighted to implement an addition ratio shown in FIG. 3 and then mixed with the raw tantalum powder. After the addition of an adequate amount of binder to each of the resulting mixtures, the mixtures were sufficiently dried. The dried mixtures each was molded together with a tantalum wire by a molding machine. The resulting moldings each had a diameter (Dφ) of 6 mm and a density (Dg) of 4.5 g/cc. The moldings were sintered in vacuum at 30° C. for 30 minutes.

FIG. 3 shows mechanical strengths, electrical characteristics and contraction ratios measured with the above moldings, i.e., samples #1 through #23. In the sample number column of FIG. 3, "1", "2" and "3" are respectively representative of samples with cohered powder contents not lying in the range of the present invention, samples with cohered powder grain sizes not lying in the range of the present invention, and samples with cohered powder contents and grain sizes both of which do not Lie in the ranges of the present invention.

As FIG. 3 indicates, by adding each cohered powder to the tantalum powder by more than 2 wt % inclusive, it is possible to increase the mechanical strength and reduce the scatter thereof. At the addition level of 0 wt %, the mechanical strength is low and scattered over a broad range. By mixing the raw powder and each cohered powder before compounding, as shown in FIG. 2, it is possible to evenly mix the cohered powder with the raw powder and therefore to reduce the scatter in mechanical strength. In addition, the tan δ value increases with an increase in the addition ratio of the cohered powder. However, addition ratios above 5 wt %, e.g., an addition ratio of 6 wt % lowers the CV value and prevents the desired electrical characteristic from being achieved. Grain sizes of cohered powder less than 40 μm lower the tan δ value because powder with small grain sizes increases and promotes sintering. Grain sizes above 200 μm lower the CV value and prevent the desired electrical characteristic from being attained. The range of addition ratios and the range of grain sizes particular to the present invention insure high mechanical strength, small scatter, and desired electrical characteristic.

An alternative embodiment of the present invention is as follows. Powder having a CV value of 50,000 μFV/g and serving as raw powder and Low CV powder (20,000 μFV/g) were prepared. The raw powder was weighted to implement addition ratios shown in FIG. 4 and then mixed with cohered powder, as shown in FIG. 2. This was followed by the production of samples and estimation, as in the previous embodiment. FIG. 4 shows mechanical strengths, electrical characteristics and contraction ratios measured with the resulting moldings. In the sample number column of FIG. 4, shows that the amount of addition of the Low CV powder does not lie in the range particular to the present invention. As FIG. 4 indicates, even the addition of Low CV powder is successful to achieve the same results as discussed in relation to the previous embodiment.

In summary, in accordance with the present invention, by adding cohesive powder or Low CV powder to High CV powder, it is possible to noticeably enhance an anchor effect during molding and therefore to increase the mechanical strength of a molding. Further, the addition of powder cohered beforehand prevents a contraction ratio from increasing at the time of sintering and thereby prevents the cavity distribution of an anode body from increasing, so that the electrical characteristic is improved.

Various modifications will become possible for those skilled in the art after receiving the teachings of the present disclosure without departing from the scope thereof.

What is claimed is:

1. In tantalum powder for an anode body included in a solid electrolytic capacitor, cohered powder having a grain size ranging from 40 μm to 200 μm is added to raw powder having a CV value greater than 40,000 μFV/g inclusive in an amount of 2 wt % to 5 wt %.

2. In a solid electrolytic capacitor, an anode body is produced by sintering tantalum powder consisting of raw powder having a CV value greater than 40,000 μF FV/g inclusive and cohered powder having a grain size ranging from 40 μm to 200 μm and added to said raw powder in an amount of 2 wt % to 5 wt %.

3. In tantalum powder for an anode body included in a solid electrolytic capacitor, powder having a CV value ranging from 20,000 μFV/g to 30,000 μFV/g is added to raw powder having a CV value greater than 40,000 μFV/g inclusive in an amount of 2 wt % to 5 wt %.

4. In a solid electrolytic capacitor, an anode body is formed by sintering tantalum powder consisting of raw powder having a CV value greater than 40,000 μFV/g inclusive and powder having a CV value ranging from 20,000 μFV/g to 30,000 μFV/g and added to said raw powder in an amount of 2 wt % to 5 wt %.

* * * * *